United States Patent [19]

Lipinski

[11] Patent Number: 4,519,297

[45] Date of Patent: May 28, 1985

[54] SEALED MOTION TRANSFER APPARATUS UTILIZING A PRESSURE FLUID CYLINDER

[75] Inventor: Reinhard Lipinski, Plochingen, Fed. Rep. of Germany

[73] Assignee: PROMA Produkt-und Marketing Gesellschaft mbH, Plochingen, Fed. Rep. of Germany

[21] Appl. No.: 563,028

[22] Filed: Dec. 19, 1983

[30] Foreign Application Priority Data

Jan. 14, 1983 [EP] European Pat. Off. ........ 83100256.3

[51] Int. Cl.3 ............................ F16J 1/14; F01B 1/02

[52] U.S. Cl. .......................................... 92/88; 92/129; 92/138; 92/151; 92/255

[58] Field of Search ................... 92/88, 129, 138, 151, 92/165 R, 167, 168, 169, 175, 248, 255

[56] References Cited

U.S. PATENT DOCUMENTS

| | | | |
|---|---|---|---|
| 2,648,310 | 8/1953 | Baer, Sr. | 92/88 |
| 3,309,967 | 3/1967 | Taplin | 92/101 |
| 3,926,094 | 12/1975 | Kurichh et al. | 92/101 |
| 4,004,657 | 1/1977 | Ostrowski | 92/129 |
| 4,164,893 | 8/1979 | Granbom et al. | 92/88 |
| 4,287,968 | 9/1981 | Stensson et al. | 92/129 |
| 4,338,857 | 7/1982 | Mason | 92/129 |
| 4,401,011 | 8/1983 | Wallberg | 92/138 |

FOREIGN PATENT DOCUMENTS

| | | | |
|---|---|---|---|
| 2344932 | 4/1974 | Fed. Rep. of Germany | 92/138 |
| 2033537 | 5/1980 | United Kingdom | 92/248 |

*Primary Examiner*—Robert E. Garrett

*Attorney, Agent, or Firm*—Frishauf, Holtz, Goodman & Woodward

[57] ABSTRACT

To prevent distortion of the cylinder, and free running of the motion transfer element (6) thereon, in guide tracks (12) formed on the outside of the cylinder, the piston (5) is formed in two piston parts (22, 22') connected by a piston rod or pin (26, 26', 26*a*, 26*a*', 26*b*, 26*b*', 26*c*, 26*c*', 26*d*, 26*d*'), and the motion transfer element (6) is coupled to the piston rod or pin by a pair of fork-like portions (20) surrounding the pin and permitting limited radial movement. The pin or piston rod may be somewhat flexible, or made of flexible material, for example unitary with the piston parts (22, 22') and of plastic material, or may be made in two portions or parts (22, 22'; 22*a*, 22*a*' . . . ), each individually coupled to the fork-shaped element or merely retaining the fork-shaped element in position with end shoulders (25, 25') of the piston part axially engaging the fork-shaped element and hence transferring motion to the motion transmitting element (6).

20 Claims, 7 Drawing Figures

FIG.1
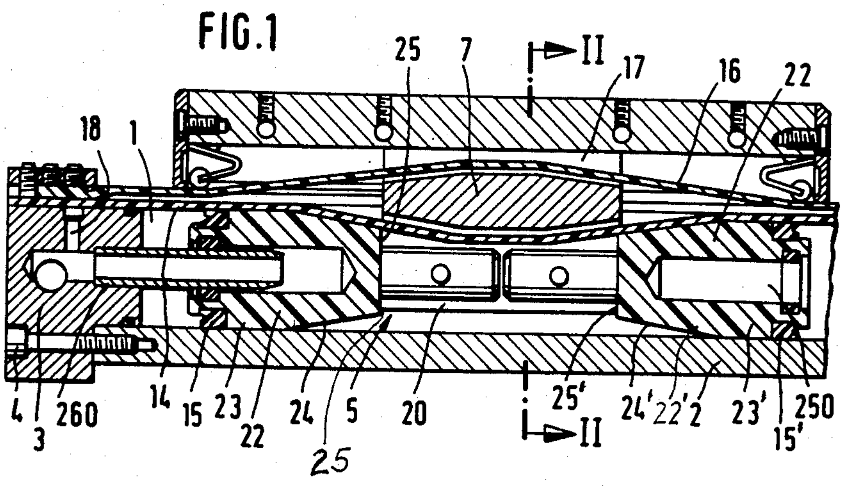
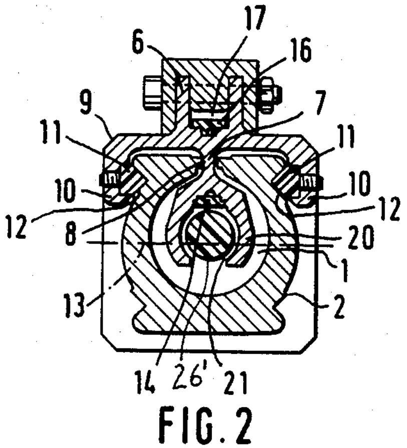
FIG. 2

FIG.6
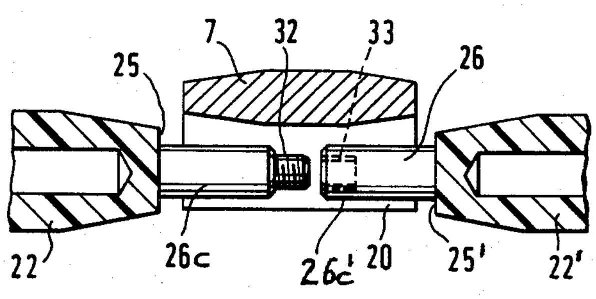
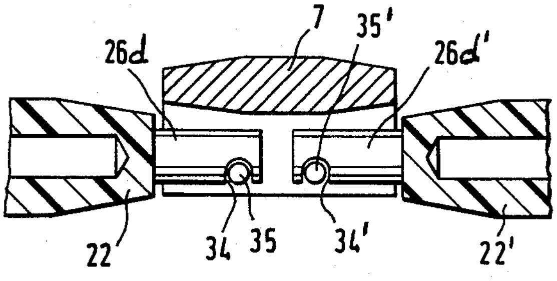
FIG.7

SEALED MOTION TRANSFER APPARATUS UTILIZING A PRESSURE FLUID CYLINDER

Cross reference to related applications, the disclosure of which is hereby incorporated by reference: Ser. No. 383,795 filed June 1, 1982, Kaiser; U.S. Ser. No. 447,522, filed Dec. 7, 1982, LIPINSKI et al; U.S. Ser. No. 463,167, filed Feb. 2, 1983, LIPINSKI et al; the latter two assigned to the assignee of the present application.

German Patent Disclosure Document No. DE-OS 31 24 915 to which the above referenced Ser. No. 383,795 corresponds.

The present invention relates to a motion transfer apparatus, and more particularly to converting pressure of a pressurized fluid, such as a hydraulic fluid compressed air, or the like, in longitudinal motion, in which the movable element is completely sealed with respect to a pressure cylinder, the pressure has a longitudinal slit, and the motion transfer element includes a web passing through the slit to provide for transmission of motion, as pressurized fluid is introduced into the cylinder.

BACKGROUND

Various types of pressure cylinders which are longitudinally slit have been proposed; a piston is longitudinally slidably retained within the cylinder, and a flexible sealing strip is provided, sealing the slit in the region between the piston and an end cap of the cylinder, so the pressurized fluid admitted to the cylinder will be retained therein, moving the piston, the sealing strip peeling off from the slit, or reseating itself on the slit, as the piston moves.

In accordance with a previously provided structure, the piston has a web element attached thereto, passing through the slit which, in turn, is connected to a bail-like structure which engages in guide grooves or guide rail elements located parallel to the longitudinal slit at the outside wall of the cylinder, to guide the motion and power transmitting web-shaped element. The guide tracks preferably are located on both sides of the slit, are parallel to each other, and provide longitudinal tracks for the motion transmitting element to retain it in position and to provide for easy sliding movement thereof.

U.S. Ser. No. 383,795, filed June 1, 1982, Kaiser, assigned to the assignee of the present application, to which German Patent Disclosure Document No. DE-OS 31 24 915 corresponds describes such an arrangement in which the motion transmitting element is supported on a pair of guide tracks or guide rails. The motion transmitting element is capable of accepting transverse forces or torques, since further torque transmission to the piston within the element itself is inhibited by engagement of the guide elements on the bail and the tracks.

It has been found, in use, that high internal pressures and unusual torques may tend to distort the cylinder and/or the guide tracks and/or the bail elements, resulting in difficulties in operation thereof, and possibly even in malfunction.

Guiding the motion transfer element requires engagement of the guide elements on the bail—which reaches around, and in some embodiments may at least partly encompass the cylinder—with some play or clearance since, otherwise, easy sliding motion is inhibited. Providing or permitting some play or clearance also permits a small, limited tilting movement of the motion transmitting element with respect to the axis of the cylinder. It has been found that, upon heavy loading, the motion transmitting element and/or the web thereof may be subjected to elastic deformation. The flexible sealing strip which extends longitudinally of the cylinder to seal the longitudinal slit thereof is lifted off sealing engagement from the slit in the region of the motion transmitting element. Consequently, some axial minimum distance must be provided between the sealing rings and the lifting-off range, which requires a certain minimum distance for the length of the pistons within the cylinder. Upon twisting or tipping torques being applied to the motion transmitting element, the length of the pistons within the cylinder have a lever effect, which may result is substantial radial deflection of the ends of the pistons. Piston rings or other sealing elements which are secured thereto must accept deflecting forces which, upon frequent occurrence, leads to difficulties with sealing, premature damage or possible destruction thereof. Additionally, such deflection results in non-uniform loading of the sealing rings or piston rings, which further detracts from long useful life and ready sliding movement thereof within the cylinder structure.

Motion transfer elements of the type in which a longitudinal slit is provided have the particular advantage that the cylinders can be made quite long, with respect to their diameter. If the cylinders are long, they may tend to bow downwardly, or deflect, for example due to their own weight; if hydraulic fluid is used, introducing the fluid within the cylinder changes the weight-distance relationship of the static loading of the cylinder which, additionally, contributes to unexpected deviation from predetermined dimensions or positions.

THE INVENTION

It is an object to improve a motion transfer apparatus using a longitudinally slit cylinder which, in operation, is essentially independent of conditions of loading, minor deflections or twisting torques introduced by the motion transfer element itself, and which is readily capable of accepting slight bending or bowing of the cylinder tube, for example due to its own weight, or its weight and the weight of a pressure fluid.

Briefly, the piston which, in such motion transfer apparatus, is elongated, is so constructed that it is made of two elongated piston portions, each one piston portion or part including a piston-cylinder seal. The piston portions or parts are coupled to the motion transfer element by a floating connection permitting limited relative radial movement of the motion transfer element with respect to the piston portions or parts.

The motion transfer element itself is guided by parallel guide tracks located at the outside of the cylinder tube. By connecting the motion transfer element, floatingly, to a two-part piston, the play or clearance between the guide elements on the motion transfer element and the guide tracks can be reduced, so that only limited, minimum clearance is needed to insure free longitudinal operation. The piston itself can be fitted tighter, or with closer tolerance within the cylinder, so that a tolerance compensation with respect to the inner wall thereof can be obtained since its position can be floatingly adjusted in such a manner that forces acting thereon are distributed uniformly about its circumference, and no eccentrically effective forces are transferred thereinto. The piston, thus, is self-centering. Small bend-through of the cylinder tube can be accepted since the pistons will, automatically, fit into the bent-through portion, self-centered—without losing their centered uniformly loaded position.

It has been found that, in operation, the longitudinal slit of the cylinder tube can be slightly expanded when the pressure fluid is applied thereto. This may lead to a slight change in the shape or position of the cross section of the internal wall configuration of the cylinder. Since the two piston portions or parts are floatingly connected together, permitting limited radial movement, even soft piston-cylinder seals can readily adapt themselves to the change in shape or form of the cylinder walls without being impeded in such self-adjusting, self-matching engagement by the piston structure itself.

In accordance with a preferred embodiment of the invention, the piston parts or portions are made of plastic material.

DRAWINGS

FIG. 1 is a schematic fragmentary longitudinal view through a piston-cylinder arrangement, omitting elements not necessary for an understanding of the present invention;

FIG. 2 is a transverse cross-sectional view along line II—II;

FIG. 6 is a view similar to FIG. 3, illustrating a further embodiment; and FIG. 7 is a view similar to FIG. 3, illustrating yet another embodiment.

BASIC STRUCTURE, WITH REFERENCE TO FIGS. 1 AND 2

Figure 3:
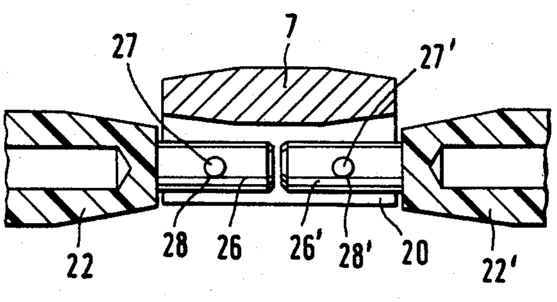
FIG. 3 is a fragmentary axial cross-sectional side view of the piston of FIG. 1, to an enlarged scale with respect to FIG. 1.

A cylinder 2, having a bore 1 therein, is closed off at one end by a cover 3, connected to the cylinder by suitable screws, one of which is shown at 4.

A piston 5 is longitudinally slidably guided within the cylinder bore 1. The piston 5 is connected to a motion transfer element 6. A web-like portion 7 extends through a longitudinal slit 8 (FIG. 2) of the cylinder tube 2, connecting together the piston 5 and the motion transfer element 6. The motion transfer element 6 has a bail or fork-shaped portion 9 extending around the upper end of the cylinder 2; in some embodiments, the depending portions of the bail 9 may also extend to the lower side of the cylinder 2. The depending parts of the bail 9 are formed as depending end legs 10 which, at their inside, carry guide strips 11, for example made of low-friction plastic material, such as nylon or the like. The guide strips 11 are guided in guide tracks 12 which are formed at the outer wall of the cylinder tube 2. In cross section, the tracks 12 are approximately triangular, and the guide strips 11 fit into the guide tracks 12. As best seen in FIG. 2, the guide tracks 12 are located in the region of the outer edge of the longitudinal slit 8 and positioned symmetrically with respect to a plane which extends at right angle to the plane of symmetry 13, passing centrally through the slit 8.

The slit 8 is sealed at both sides of the piston by an internally positioned flexible sealing strip 14. The sealing strip 14 is anchored at its end portions in the covers 3 and guided within the region of the piston 5 beneath the web-shaped portion 7 of the force transfer element 6.

The piston 5 is sealed within the cylinder by soft sealing rings 15. The portion within the cylinder between the sealing rings 15 at the ends of the piston—referring to FIG. 1—is not pressurized, so that the longitudinal slit can be opened in that region to permit the web-shaped portion 7 to be removed from sealing contact with the interior wall portions of the cylinder immediately adjacent the slit without loss of pressure medium. The length of the piston 5 in the zone between the sealing rings 15 thus is at least as long as the unpressurized portion of the cylinder.

A flexible cover strip 16 is located above the sealing strip 14. It is likewise secured in the covers 3, and carried through an opening 17 of the force transfer element 6. The sealing strip 16, in cross section, has a longitudinal groove, formed, in cross section, with wedge-shaped portions and cooperate with an essentially wedge-shaped projection on the sealing strip 14, and which extends in the slit 8. The cooperation of the sealing strips 14, 16 does not form part of the present invention, and thus is not shown specifically in the drawings. Pressure rollers on the force transfer element, located approximately above the end portions of the piston 5, tend to press the sealing strip 14 upwardly in sealing relationship against the inner wall portion of the cylinder, the sealing strip 16 downwardly against the outer surface of the cylinder, and the interengaging projection-and-groove structure of the strips 14, 16, in resilient engagement.

The sealing strip 14 seals the longitudinal slit 8 at both sides of the piston 5. If pressurized fluid is introduced through the cover 3—of which only one is shown—for example through a pressure fluid duct 18, the piston 5 will be moved longitudinally within the cylinder, as well known. A suitable pressure fluid is, for example, compressed air; hydraulic fluids may also be used.

The force transfer element 6 extends inwardly of the slit by the web 7. A fork-shaped element 20 extends from the web 7. The two legs of the fork element 20 are formed with a symmetrical longitudinal slit 21 through which the sealing strip 14 is guided. The inner walls of the opening 21 are part-cylindrical—see FIG. 2. A recess, in form of a groove, is provided in the region of the sealing strip 14 in order to receive the sealing strip.

The piston 5 is formed of two piston parts or piston elements 22, 22'. In accordance with a preferred embodiment of the invention, the piston parts may be made of plastic material. Each one of the piston parts 22, 22' has a cylindrical portion 23, 23'. Respective sealing rings 15, 15' are located at end portions of the cylindrical parts 23, 23'. Facing each other, and inwardly of the cylindrical portions, are frusto-conical portions 24, 24' which terminate in facing shoulders 25, 25'. The respective piston parts or portions 22, 22' are axially supported by the respective shoulders 25, 25' on the fork or encompassing or jaw parts 20 of the force transfer element 6.

The outer end portions of the pistons each include a damping bore 250 which cooperates with a damping tube 260, as shown at the left side of FIG. 1, and as well known as such.

The two piston parts 22 are secured to the fork or jaw portion 20 of the force transfer element 6 for independent, limited, radial movement.

Various connecting arrangements between the fork or jaw element 20 and the piston parts 22, 22' can be provided.

In accordance with a feature of the invention—see FIGS. 1 and 3—the two piston parts 22 are formed with an axially projecting cylindrical pin 26, 26' (FIG. 3) which is fitted—with play—in the part-cylindrical opening 21 of the fork or jaw-shaped element 20. The two piston parts 22 are axially connected to the jaw or fork-like part 20 by respective cross pins 27, 27', passing through the opening 21 and into matching receiving openings 28, 28' in the fork-shaped element 20. The pins 27, 27' thus connect the projecting pins 26, 26' of the pistons to the motion transfer element 6, the respective dimensions of the pins and openings being so selected that some play is possible.

Figure 4:
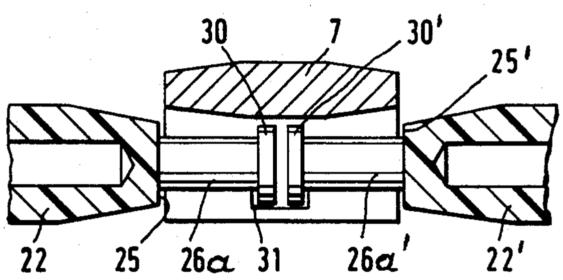
FIG. 4 is a view similar to FIG. 3, illustrating another embodiment.

FIG. 4: Projecting pins *26a, 26a'* extending from the piston parts 22, 22' are formed with end flanges 30, 30'. The flanges 30, 30' fit into a ring groove 31, formed in the region of the surrounding jaw or fork parts 20 of the extension from the web 7 of the motion transfer element 6. The engagement of the end portions of the jaw or fork elements 20 with the respective shoulders 25, 25' and engagement of the flanges 30, 30' with the ring groove 31 provides for power transmitting engagement while permitting some play in radial, circumferential, and axial direction. By suitable dimensioning of the groove 31 and of the partially cylindrical opening 21, as well as the diameter of the cylindrical pins or bolt elements *26a, 26a'*, radial movement of the two piston parts 22, 22' independently of each other and with respect to each other as well as with respect to the piston is thereby insured.

Figure 5:
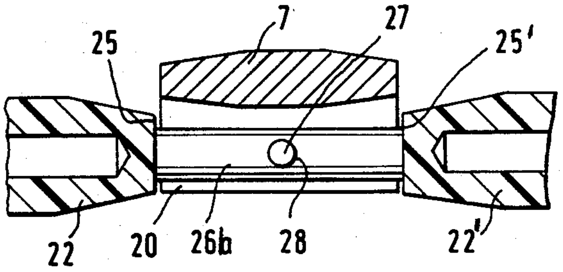
FIG. 5 is a view similar to FIG. 3, illustrating yet another embodiment.

Embodiment of FIG. 5: A single pin *26b* connects the two piston parts 22, 22'. A single cross bore 28, into which a single cross pin 27 is secured, similar to the arrangement of FIG. 3, connects the fork or jaw-shaped part 20 of the motion transfer element 6 for limited radial movement with respect to the pistons. The piston parts 22, 22' are secured together, but the motion or force transfer element 6 is floatingly connected to the piston parts by oversize dimensioning of the opening 28.

FIG. 6: The embodiment of FIG. 6 is particularly easy to assemble; the pins *26c, 26c'* are formed with a projecting thread 32 and tapped hole 33, respectively, so that the respective piston parts can be readily assembled together. Rather than using a thread connection, other releasable and engageable connection systems may be used, such as snap-in connections, twist-on connections similar to bayonet connections, and the like.

The connection of the piston parts 22, 22' with the fork or jaw-shaped element 20 is by axial connection of the shoulders 25, 25' against the axial end faces of the jaw or fork element 20. The connection of the threads 32, 33 thus so connects the piston parts 22, 22' that they act similar to a force transfer bolt, which applies pressure at the respective end faces against the axial end faces of the fork-shaped element in the manner of a tightened bolt. If desired, a similar arrangement may be made in FIG. 5, that is, the pin 27 in the opening 28 can be omitted. Radial movement, that is, tilting or rotating movement of the web 7 about the axis of the pistons continues to be possible. If desired, and after assembly of the parts 22, 22' in FIG. 6, a cross bore, for example previously made, can be used to connect the screw connection 32, 33 together and by a pin 27 with an opening 28 in the fork or jaw element, coupling of all the elements in respective axial and loose radial arrangement.

FIG. 7: The piston portions or parts 22, 22' are connected by pin elements *26d, 26d'* which are formed with an open cross groove 34. The wedge-shaped element, in the region of the opening 21, is formed with a pair of inwardly projecting pins 35, 35' to receive the respective grooves 34, 34', in hook-like engagement position, as seen in FIG. 7. By suitable dimensioning of the respective parts, as illustrated in all the embodiments of the piston 5, limited radial movement of the piston parts 22 with respect to the fork-shaped or jaw-shaped element 20, and hence with the force or motion transmitting element 6, is insured.

The respective pins 26, *26a* . . . , 26', *26a'*. . . , as shown, are secured to the piston parts 22, 22'. Of course, the relationship could be reversed in that the force transmitting element 6 has laterally projecting coaxial pins, fitted in the cylinder bore 1, and received in suitable reception openings of the piston parts 22, 22' in such a manner that limited radial movement is permitted, without, however, permitting, essentially, axial movement. In accordance with a preferred embodiment, axial movement should be excluded. Thus, the respective diameters of the openings 27 and pins 28 can be so selected that they are comparatively tight in axial direction, while permitting circumferential or tilting movement; the opening 28, then, would not be circular but, rather, elongated or O-shaped, with the longer axis extending in circumferential direction. Essentially only radial movement, with an axial fit tight enough to just permit easy sliding movement is readily insured, for example, by the embodiments of FIGS. 4 and 7, in which the embodiment of FIG. 7 permits particularly easy assembly of the respective elements.

The sealing rings 15, 15' on the piston parts or portions 22, 22' are thus radially movable with respect to the motion or power transfer element 6. Consequently, the piston parts 22 and their sealing rings 15 are self-centering within the cylinder bore 1. Adjustment within the tolerance region due to possible tilting or twisting forces transferred by the motion transfer element thus cannot affect the centering and positioning of the pistons 22. The pistons 22 and the sealing rings 15 can, therefore, fit readily not only against the flexible sealing strips 14, 16, but also against the inner walls of the piston which, for example, is made of a stiff material such as steel. Even if a long cylinder tube 2 is subjected to some bending-through or bowing or other deformation, or deformed due to the presence of the longitudinal slit 8 and the effect of fluid pressure, thus resulting in slight expansion of the diameter of the cylinder, for example, no loss of fluid or pressure effect will be experienced even if the motion transfer element should operate in a deformed region.

Various changes and modifications may be made, and any features described herein may be used with any of the others, within the scope of the inventive concept.

Mechanical connection is particularly simple in the embodiments of FIGS. 5 and 6, in which the two piston parts 22, 22' are connected by a pin or bolt element which is axially engaged with shoulders 25, 25', respectively, against the axial end surfaces of the fork or jaw-shaped element 20. The axial engagement, with no axial play, except just sufficient to permit limited rocking of the elements 6, 7, provides for effective force transfer with floating radial coupling. Use of a pin 27 (FIGS. 3, 5) permits different tolerance relationships. Use of two axially extending pins or bolts 26, 26' (FIG. 3) and engagement by cross pins 27, 27' in openings 28, 28', for example permitting only circumferential rocking of the elements 20 and 7, provides for secure attachment, excellent force transfer relationships, and simple assembly, for example carried out before connecting the end cap 3 to the cylinder 2.

The arrangement of FIG. 7, in which two cross pins 35, 35' are provided to receive hook-shaped grooves 34, 34', is particularly simple to assemble. A similar arrangement can be made with a single pin corresponding to the two pins **26*d*, 26*d*' and, for example, a single cross pin and groove. In the embodiment of FIG. 4, the flanges 30, 30' engage in a groove 31 of the fork or jaw-shaped element 20 which also permits ready assembly of the elements. Other connection arrangements between the web element 7 of the motion transfer element 6 and the piston parts or portions 22, 22' may be used, permitting limited radial deflection of the element 7 and, if desired, also limited axial deflection, and limited respective movement of the piston parts 22, 22'**, as desired, and as required, for example, by the longitudinal extent of the entire unit.

I claim:

1. Sealed motion transfer apparatus having a pressure cylinder (2) closed at one end and formed with a longitudinal slit (8);

a piston (5) slidable in the pressure cylinder;

a motion transfer element (6) coupled to the piston and having a portion (7) extending through the slit (8) for transferring motion of the piston externally of the cylinder;

a flexible elongated sealing element (14) sealingly positioned in the slit, in a pressurized region of the cylinder; and positioned outside of the slit in a region of the motion transfer element (6) to define an unpressurized region of the cylinder;

guide means (9) secured to the motion transfer element and at least partly surrounding the outside of the cylinder;

and guide tracks (12) formed on the outside of the cylinder and located adjacent opposite sides of the slit to receive the guide means, wherein, in accordance with the invention, the piston comprises two elongated piston parts (22, 22'), each piston part including a piston-cylinder seal (15);

and wherein said piston parts (22, 22') are coupled to the motion transfer element (6) by a radially floating connection between the piston parts and permitting limited relative radial movement of the motion transfer element with respect to the piston parts.

2. Apparatus according to claim 1, wherein said piston parts (22, 22') comprise plastic material.

3. Apparatus according to claim 1, further including an axially extending pin (**26, 26', 26*a*, 26*b*, 26*c*, 26*d*) extending from facing ends of said piston parts (22, 22'**) and connecting said piston parts together in spaced relationship;

and coupling means (20) having an opening surrounding said axially extending pin, secured to said motion transfer element (6) to couple the motion transfer element to the pin, and hence to the pistons, in axially, essentially fixed position but permitting limited rotary movement of the motion transfer element with respect to the piston parts (22, 22').

4. Apparatus according to claim 3, wherein the axially extending pin comprises two coaxially positioned pin elements (26, 26').

5. Apparatus according to claim 3, wherein (FIG. 5) said axially extending pin comprises a unitary element (**26*b***).

6. Apparatus according to claim 3, further comprising abutment shoulders (25) formed on facing end surfaces of said piston parts (22, 22') and providing for axial engagement of the motion transfer element (6) with the piston parts.

7. Apparatus according to claim 3, further including a coupling portion (20) secured to said motion transfer element (6) and, at least in part, surrounding said pin;

and a cross pin (27) connecting said pin and the coupling portion, and passing through an opening (27) in the pin connecting said piston parts.

8. Apparatus according to claim 3, further including a coupling portion (20) secured to said motion transfer element (6) and, at least in part, surrounding said pin.

9. Apparatus according to claim 8, wherein (FIG. 7) the pin (**26*d*, 26*d*') is formed with an open cross groove (34, 34'), and a cross pin (35, 35'**) is provided, the open groove being hooked over the cross pin.

10. Apparatus according to claim 8, wherein (FIG. 7) said pin comprises two pin parts (**26*d*, 26*d*'), each secured to one of said piston parts (22, 22'**);

two cross pins (35, 35') are provided, extending transversely with respect to the axis of the cylinder into the coupling portion (20);

and wherein said pin parts (**26*d*, 26*d*') are formed with open grooves (34, 34') hooked over said cross pins (35, 35*d***) to permit limited relative radial deflection of said motion transfer element while providing for axial coupling thereto.

11. Apparatus according to claim 8, wherein (FIG. 4) said coupling portion (20) is formed with a radial groove (31);

and said pin comprises two pin portions (**26*a*, 26*a*'), each secured to one of said piston parts (22, 22') and formed with a terminal flange (30, 30'), the terminal flange being fitted into and engaging in said radial groove (31**).

12. Apparatus according to claim 8, wherein (FIG. 6) said pin comprises two pin parts (**26*c*, 26*c*'), and a screw-and-tap connection (32, 33) connecting said pin parts together, said pin parts being, respectively, secured to the piston parts (22, 22'**).

13. Apparatus according to claim 8, wherein said coupling portion is fork-shaped and defines, between the legs of the fork-shaped coupling portion, an opening (21) surrounding said pin, the fork-shaped portion extending from the portion (7) of the motion transfer element passing through said slit (8).

14. Apparatus according to claim 13, wherein the motion transfer element is formed with a longitudinal slit (14) positioned immediately adjacent the junction of said fork-shaped elements of the motion transfer element to receive the flexible elongated sealing element (14) in the unpressurized region of the cylinder.

15. Apparatus according to claim 1, wherein the overall length of the piston (5) formed of said piston parts (22, 22') has a longitudinal dimension between the piston-cylinder seals (15) on each piston part which is at least as long as the unpressurized region of the cylinder (2).

16. Apparatus according to claim 2, wherein the overall length of the piston (5) formed of said piston parts (22, 22') has a longitudinal dimension between the piston-cylinder seals (15) on each piston part which is at least as long as the unpressurized region of the cylinder (2).

17. Apparatus according to claim 3, wherein the overall length of the piston (5) formed of said piston parts (22, 22') has a longitudinal dimension between the piston-cylinder seals (15) on each piston part which is at least as long as the unpressurized region of the cylinder (2).

18. Apparatus according to claim 4, wherein the overall length of the piston (5) formed of said piston parts (22, 22') has a longitudinal dimension between the piston-cylinder seals (15) on each piston part which is at least as long as the unpressurized region of the cylinder (2).

19. Apparatus according to claim 5, wherein the overall length of the piston (5) formed of said piston parts (22, 22') has a longitudinal dimension between the piston-cylinder seals (15) on each piston part which is at least as long as the unpressurized region of the cylinder (2).

20. Apparatus according to claim 1, wherein said piston parts (22, 22') are individually self-alignable within said cylinder (2) and separately coupled to the motion transfer element (6) by said radially floating connection between the piston parts.

* * * * *